US009213551B2

United States Patent
Shah et al.

(10) Patent No.: US 9,213,551 B2
(45) Date of Patent: Dec. 15, 2015

(54) RETURN ADDRESS PREDICTION IN MULTITHREADED PROCESSORS

(75) Inventors: Manish K. Shah, Austin, TX (US); Gregory F. Grohoski, Bee Cave, TX (US); Zeid H. Samoail, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 933 days.

(21) Appl. No.: 13/046,273

(22) Filed: Mar. 11, 2011

(65) Prior Publication Data

US 2012/0233442 A1 Sep. 13, 2012

(51) Int. Cl.
G06F 9/42 (2006.01)
G06F 9/38 (2006.01)
G06F 9/30 (2006.01)

(52) U.S. Cl.
CPC .......... *G06F 9/3851* (2013.01); *G06F 9/30054* (2013.01); *G06F 9/3806* (2013.01); *G06F 9/3855* (2013.01)

(58) Field of Classification Search
CPC .............................. G06F 9/3851; G06F 9/3806
USPC ........................................................ 712/233
See application file for complete search history.

(56) References Cited

U.S. PATENT DOCUMENTS

| | | |
|---|---|---|
| 5,604,877 A | 2/1997 | Hoyt et al. |
| 5,881,278 A | 3/1999 | Tran et al. |
| 5,954,816 A | 9/1999 | Tran et al. |
| 5,995,749 A | 11/1999 | Tran |
| 6,108,774 A | 8/2000 | Muthusamy |
| 6,170,054 B1 * | 1/2001 | Poplingher ................... 712/242 |
| 6,253,315 B1 | 6/2001 | Yeh |
| 6,789,171 B2 | 9/2004 | Desai et al. |
| 6,973,563 B1 | 12/2005 | Sander |
| 2003/0046517 A1 * | 3/2003 | Lauterbach ................... 712/214 |
| 2004/0230779 A1 | 11/2004 | Haghighat et al. |
| 2007/0288727 A1 * | 12/2007 | Altman et al. ................. 712/225 |
| 2010/0017586 A1 | 1/2010 | Gelman et al. |
| 2012/0017214 A1 * | 1/2012 | Shannon et al. .............. 718/100 |

OTHER PUBLICATIONS

McAuley et al, Fast Routing Table Lookup Using CAMs, 1993, IEEE, 11c.2.1-11.c.2.10.*

* cited by examiner

*Primary Examiner* — Andrew Caldwell
*Assistant Examiner* — Jyoti Mehta
(74) *Attorney, Agent, or Firm* — Meyertons, Hood, Kivlin, Kowert & Goetzel, P.C.

(57) ABSTRACT

Techniques and structures are disclosed relating to predicting return addresses in multithreaded processors. In one embodiment, a processor is disclosed that includes a return address prediction unit. The return address prediction unit is configured to store return addresses for different ones of a plurality of threads executable on the processor. The return address prediction unit is configured to receive a request for a predicted return address for one of the plurality of threads. The first request includes an identification of the requesting thread. The return address prediction unit is configured to provide the predicted return address to the requesting thread. In some embodiments, the return address prediction unit is configured to store the return addresses in a memory that has a plurality of dedicated portions. In some embodiments, the return address prediction unit is configured to store the return addresses in a memory that has dynamically allocable entries.

5 Claims, 10 Drawing Sheets

RETURN ADDRESS PREDICTION IN MULTITHREADED PROCESSORS

BACKGROUND

1. Technical Field

This disclosure relates to processors, and more specifically to branch prediction within processors.

2. Description of the Related Art

Instruction set architectures (ISAs) typically include call and return instructions to facilitate the performance of procedural calls (i.e., function calls or subroutine calls). To make a procedural call, an instruction sequence may include a call instruction that is executable to cause the processor to begin executing the procedure. In particular, the call instruction may be executable to change a program counter of the processor to the location of the instructions in the procedure. The processor may then begin fetching and executing instructions at that location. Once the procedure completes, a return instruction may be executed to return from the procedure call by replacing the program counter with the location of the calling program sequence. This location, referred to as a return address, may be the address of the instruction that follows the call instruction.

To keep track of the return address, a processor may store a return address in a register or push the return address onto a call stack in main memory when the processor initially executes the call instruction. The processor may then retrieve the return address and load the return address into the program counter when the return instruction is subsequently executed. A problem with storing return addresses in this manner is that retrieving them can be time consuming and reduces instruction throughput as fetching may be delayed for the retrieval of return addresses.

SUMMARY

Techniques and structures are disclosed herein that allow a multithreaded processor to predict return addresses. In one embodiment, a processor is disclosed that includes a return address prediction unit. The return address prediction unit is configured to store return addresses for different ones of a plurality of threads executable on the processor, and to receive a first request for a predicted return address for one of the plurality of threads. In such an embodiment, the first request includes an identification of the requesting thread. The return address prediction unit is configured to provide the predicted return address to the requesting thread.

In another embodiment, a method is disclosed. The method includes a processor fetching a first block of instructions including a first call instruction of a first thread. The first call instruction is associated with a first return address. The method further includes the processor fetching a second block of instructions including a second call instruction of a second thread. The second call instruction is associated with a second return address. The method further includes the processor concurrently storing the first and second return addresses in a dedicated memory.

In still another embodiment, a processor is disclosed. The processor includes an instruction fetch unit configured to fetch instructions executable on the processor. The processor further includes a return address prediction unit configured to concurrently store return addresses for different ones of a plurality of threads. The return address prediction unit is configured to receive a request from the instruction fetch unit for a return address for one of the plurality of threads. The return address prediction unit is configured to provide the return address to the instruction fetch unit.

DETAILED DESCRIPTION

Figure 1:
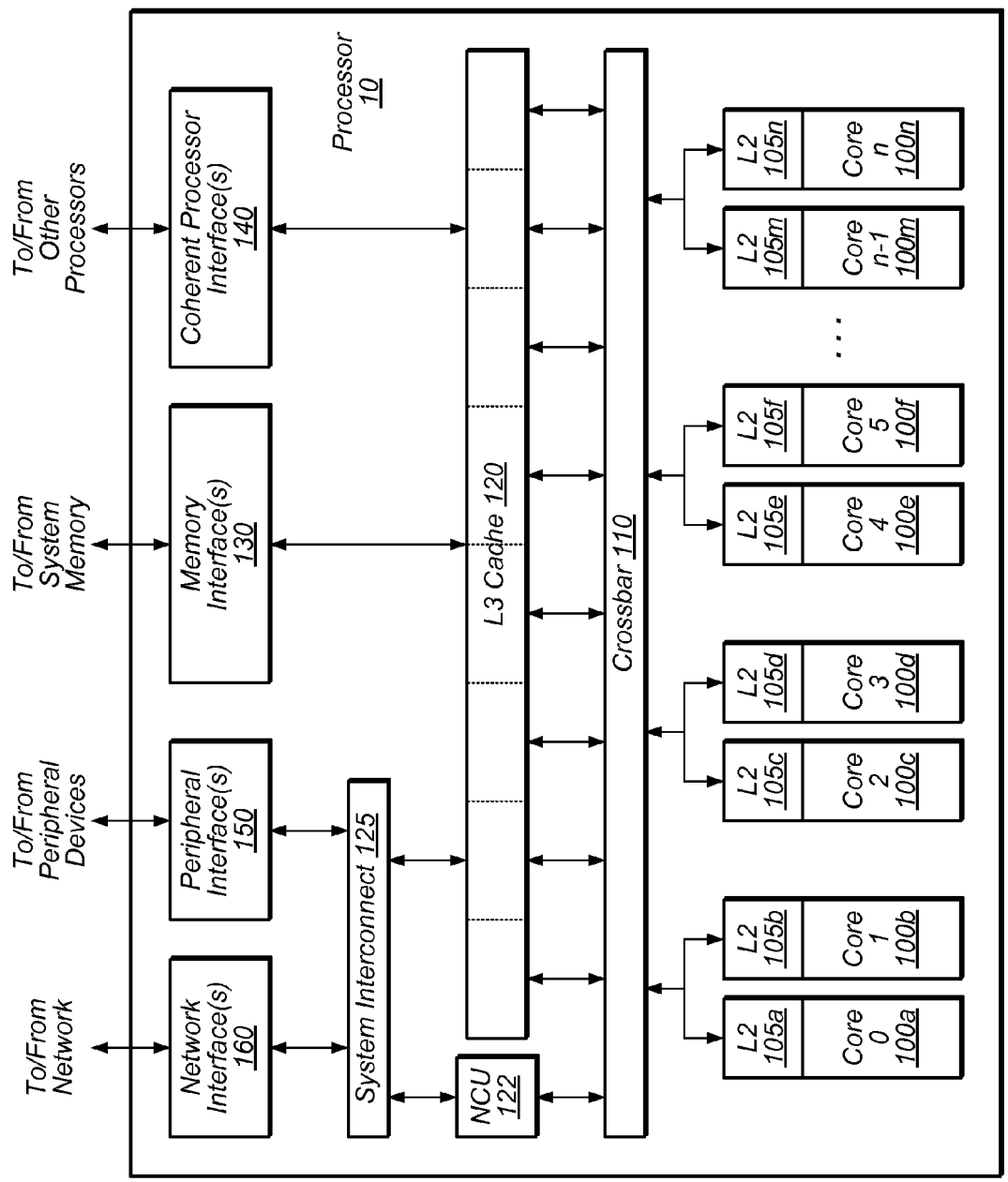
FIG. 1 is a block diagram illustrating one embodiment of an exemplary processor.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units...." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Execute." This term has its ordinary and accepted meaning in the art, and includes all actions that may be performed by a processor to effectuate the completion of the instruction, including fetch, decode, issue, as well as actually computing the result of the instruction. When a functional unit is described herein as "executing" a particular instruction, this term refers to computing a result of the particular instruction (e.g., computing the sum of the contents of two registers).

"Thread." This term has its ordinary and accepted meaning in the art, and includes a set of instructions within a program that is executable by a processor. The term "thread" may, for example, refer to a group of instructions executing on a processor as a result of a "fork" or other similar operation. Instructions described herein as being "in" a thread are a part of the set of instructions for a thread.

"Call Instruction." This term has its ordinary and accepted meaning in the art, and includes an instruction that is executable to cause a processor to begin executing instructions for a procedure, by causing the processor to change a value of a program counter to an address associated with those instructions.

"Return Instruction." This term has its ordinary and accepted meaning in the art, and includes an instruction that is executable to cause a processor to begin executing instructions once performance of a procedure is completed. In many instances, these instructions are ones that follow an initial call instruction.

"Concurrently Storing." As used herein, this phrase refers to storing multiple return addresses of different threads for some overlapping period. Note this phrase does not necessary imply that the storage of two return addresses begins at the same time or that two addresses are stored for the same length of time. For example, a first return address and a second return address are being concurrently stored if a first return address is stored for period of time $t_0$-$t_1$, a second return address is stored for a period of time $t_2$-$t_3$, and times $t_2$ or $t_3$ occurs between times $t_0$ and $t_1$.

Introduction

As noted above, retrieving return addresses from registers or a call stack in main memory can be time consuming and reduces instruction throughput. To reduce retrieval time, some processors may include a memory structure called a return address stack (not to be confused with a call stack, which is a data structure that may be stored in main memory) that stores return addresses and may be located in some embodiments near the instruction fetch unit (e.g., within a branch prediction unit). As call instructions are fetched, the instruction fetch unit may push return addresses onto the return address stack, and may pop those addresses when return instructions are subsequently fetched. The instruction fetch unit may then use those return addresses to fetch subsequent instructions.

The present disclosure recognizes that a problem with such a return address stack is that executing multiple threads may cause a return address for one executing thread to incorrectly be used as a return address for another executing thread. For example, a first thread and a second thread may include multiple call instructions and corresponding return instructions. A processor may initially execute call instructions in the first thread and then execute call instructions in the second thread before executing the return addresses in the first thread. As a result, a return address stack may have return addresses for the first thread stacked under return addresses for the second thread. If the processor begins executing return instructions in the first thread and pops return addresses from the top of the stack, the return addresses for the second thread may be used as return addresses for the first thread. Using the incorrect return addresses may effectively create a buffer overflow.

Figure 2:
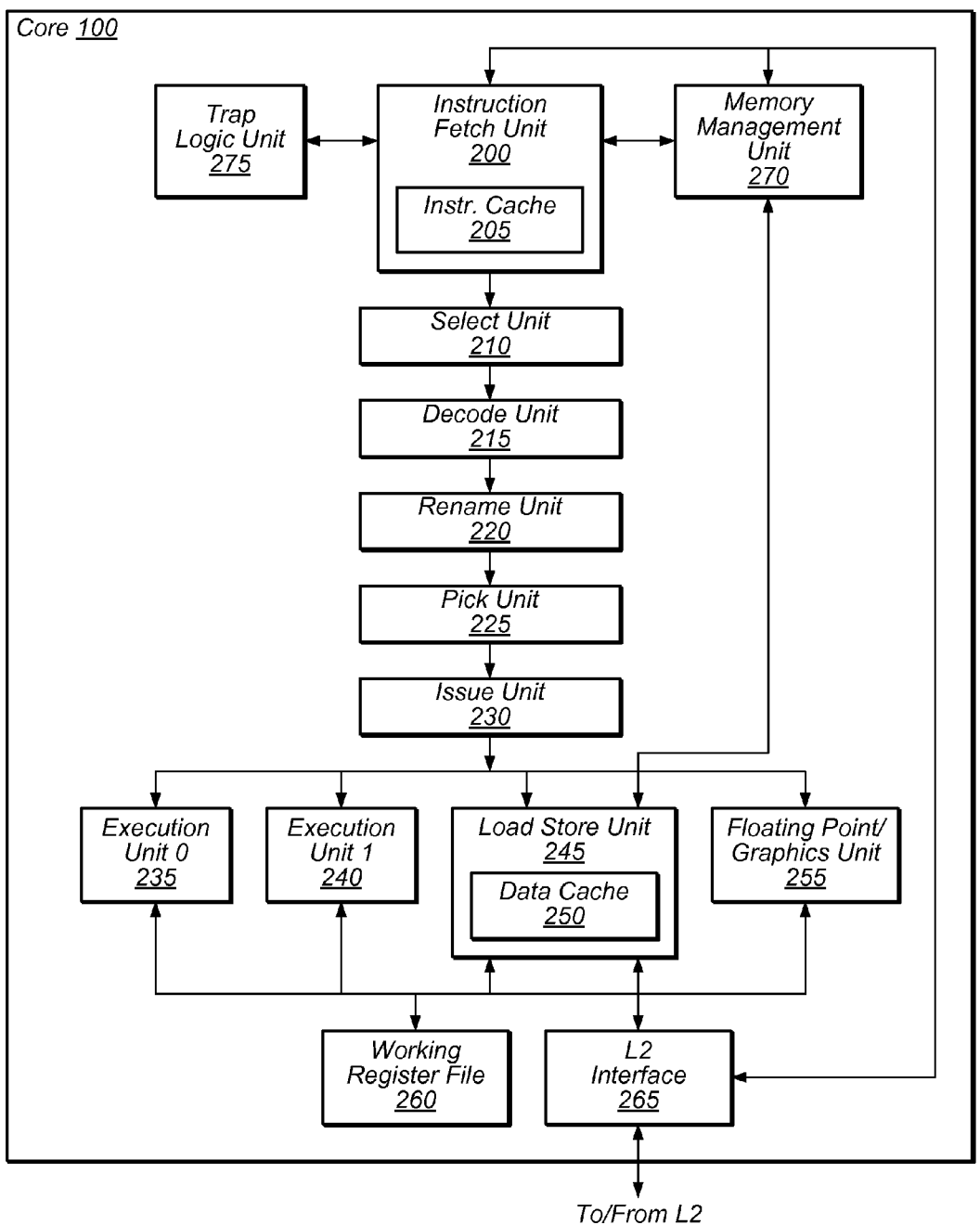
FIG. 2 is a block diagram illustrating one embodiment of an exemplary processor core.
Figure 8:
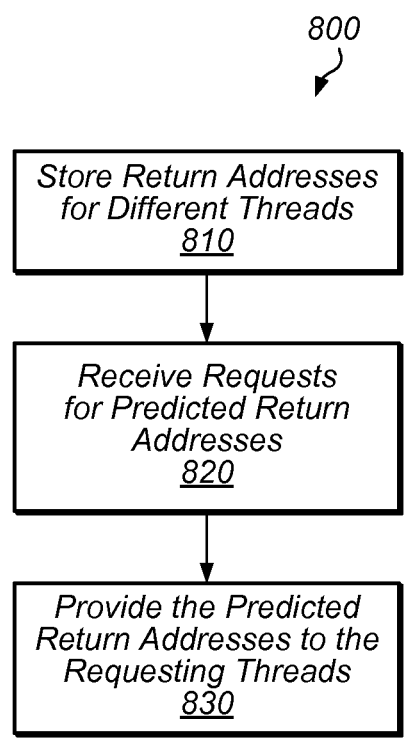
FIG. 8 is a flow diagram illustrating one embodiment of a method performed by a processor using the return address prediction unit.
Figure 9:
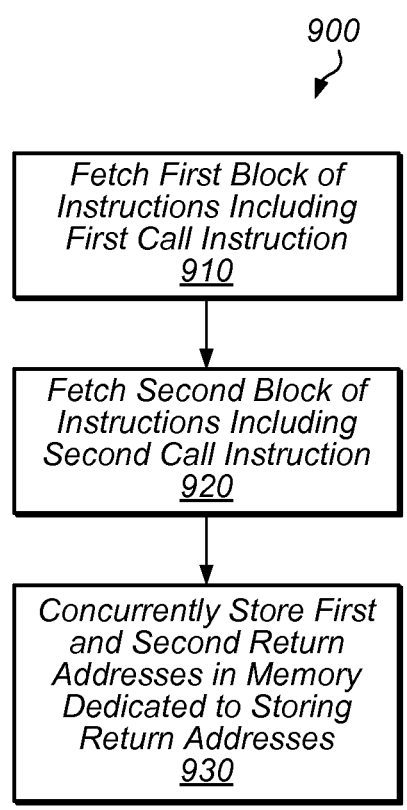
FIG. 9 is a flow diagram illustrating one embodiment of another method performed by a processor using the return address prediction unit.
Figure 10:
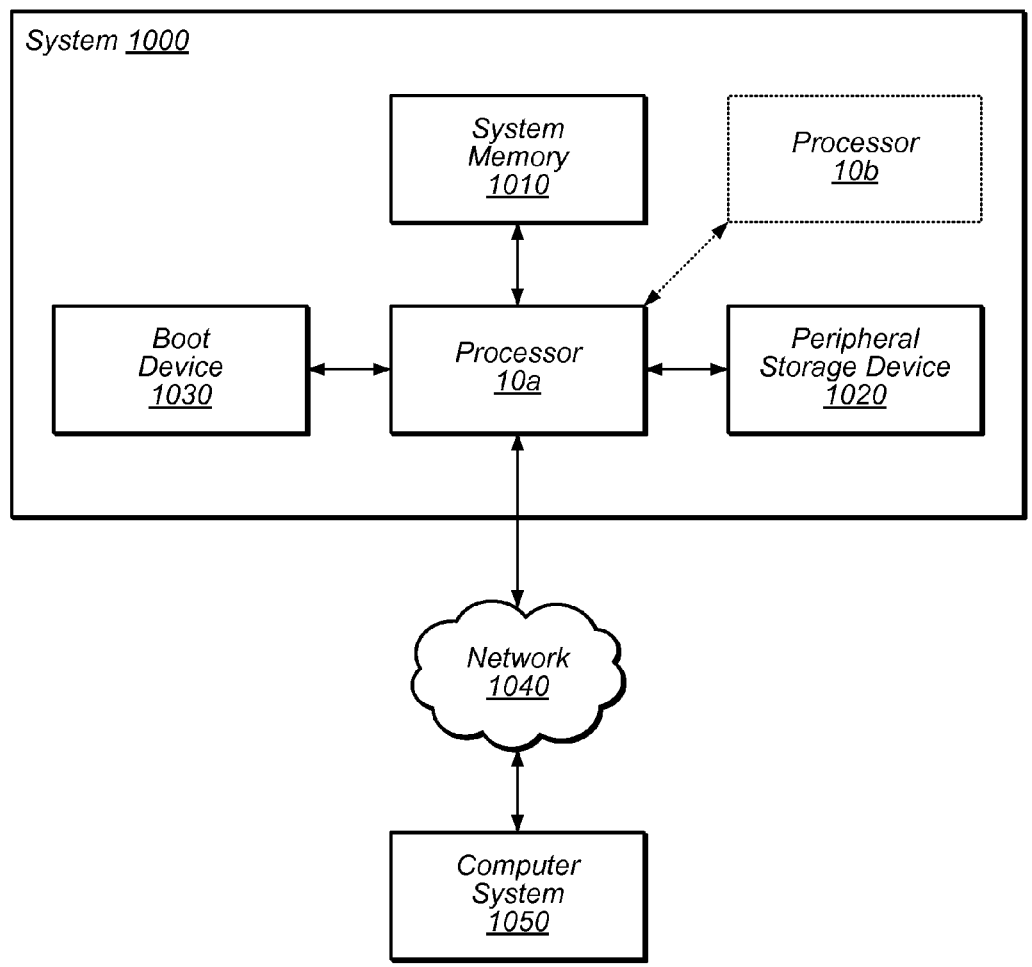
FIG. 10 is a block diagram illustrating one embodiment of an exemplary system.

The present disclosure describes various techniques for predicting return addresses in a multithreaded processor. FIGS. 1 and 2 present an overview of an exemplary multithreaded processor. FIGS. 3-7 present embodiments of a multithreaded processor core that includes a return address prediction unit configured to concurrently store return addresses for different threads. FIGS. 8 and 9 present embodiments of methods that may be performed by such a processor. FIG. 10 presents an overview of a computer system in which such a processor may be used.

General Overview of a Multithreaded Processor

Turning now to FIG. 1, a block diagram illustrating one embodiment of a processor 10 is shown. In certain embodiments, processor 10 may be multithreaded. In the illustrated embodiment, processor 10 includes a number of processor cores 100*a-n*, which are also designated "core 0" though "core n." As used herein, the term processor may refer to an apparatus having a single processor core or an apparatus that includes two or more processor cores. Various embodiments of processor 10 may include varying numbers of cores 100, such as 8, 16, or any other suitable number. Each of cores 100 is coupled to a corresponding L2 cache 105*a-n*, which in turn couple to L3 cache 120 via a crossbar 110. Cores 100*a-n* and L2 caches 105*a-n* may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel (i.e., concurrently). Additionally, as described below in conjunction with the descriptions of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, write-back cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a write-back buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a write-back cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write through instead of write-back behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a write-back buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requestors.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating-point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating-point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating-point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requestors. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Return Address Prediction

Figure 3:
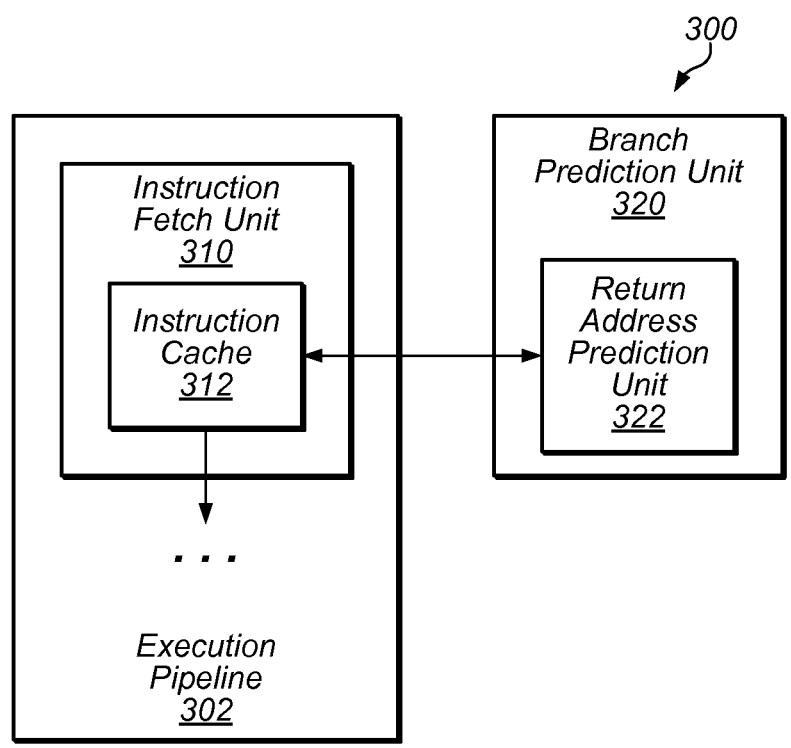
FIG. 3 is a block diagram illustrating one embodiment of a multithreaded processor core that includes a return address prediction unit.

Turning now to FIG. 3, a block diagram of a multithreaded processor core 300 (which may be included within processor 10 and/or implement various features of core 100 in some embodiments) is depicted. As will be described below, in various embodiments, processor core 300 includes an instruction fetch unit that fetches instructions in different threads for execution on core 300. To facilitate the fetching of instructions, core 300 may include a return address prediction unit that stores return addresses for different threads executing on core 300. As the instruction fetch unit fetches instructions, the fetch unit may determine whether those instructions include call or return instructions. If the fetch unit detects a call instruction, the fetch unit may provide a return address associated with that call instruction to the return address prediction unit for storage. If the fetch unit later detects a corresponding return instruction, the fetch unit may send a request for the stored return address to the return address prediction unit. The return address prediction unit may then provide the requested return address to the instruction fetch unit as a predicted return address for the fetched return instruction. The instruction fetch unit may use the predicted return address to facilitate the fetching of subsequent blocks of instructions. After the return instruction finishes execution, the actual return address (e.g., the one stored on the call stack) of the return instruction may be compared to the predicted return address for that instruction to determine whether program order was properly followed. By predicting return addresses for fetched return instructions, processor core 300, in many instances, is able to achieve greater instruction throughput than other multithreaded processor cores because core 300 may begin fetching instructions using a predicted return address instead of stalling while a return instruction executes and its return address is retrieved.

In the illustrated embodiment, core 300 includes an execution pipeline 302 that is representative of circuitry that is configured to execute instructions. As shown, pipeline 302 includes an instruction fetch unit (IFU) 310, which, in turn, includes an instruction cache 312. IFU 310 is coupled to a branch prediction unit 320, which includes a return address prediction unit 322. In some embodiments, branch prediction unit 320 may be considered as part of execution pipeline 302, or even as part of IFU 310. In various embodiments, execution pipeline 302 may include additional structures such as blocks 205-275 described above.

Instruction fetch unit (IFU) 310, in one embodiment, is configured to fetch instructions that are to be executed in pipeline 310. In various embodiments, IFU 310 may be configured to function in a similar manner to that of IFU 200 described above. In one embodiment, IFU 310 may be configured to select a thread during a given fetch cycle and to fetch one or more instructions in that thread from instruction cache 312. In some embodiments, IFU 310 may be configured to fetch a block of multiple instructions in multiple threads. In one embodiment, as IFU 310 fetches instructions, IFU 310 is configured to use prediction information provided by branch prediction unit 320 to facilitate the fetching of instructions. In some embodiments, this prediction information may include predicted branch directions, predicted target addresses, loop prediction information, etc. In the illustrated embodiment, IFU 310 is configured to use return addresses provided by return address prediction unit 322 and to provide information to unit 322 to facilitate the prediction of return addresses.

In one embodiment, when IFU 310 fetches instructions, IFU 310 is configured to determine whether fetched instructions include call instructions or return instructions. In one embodiment, IFU 310 may be configured to make this determination based on decode information stored in instruction cache 312. In some embodiments, if IFU 310 identifies multiple call or return instructions in a single fetched block, IFU 310 may be configured to process the first call or return instruction and not process the other call or return instructions at the present time. If IFU 310 identifies a call instruction in a set of fetched instructions, IFU 310, in one embodiment, is configured to provide a return address for the call instruction to return address prediction unit 322 for storage. This return address may be the address of the instruction that follows the call instruction or may be the address of another instruction that is to be executed after the procedure being called is completed. In various embodiments, IFU 310 is also configured to identify the thread of the call instruction to return address prediction unit 322 as well. If IFU 310 identifies a return instruction, IFU 310, in one embodiment, is configured to request a return address from return address prediction unit 322. In various embodiments, this request may include a thread identifier of the identified return instruction. Once IFU 310 receives the requested return address, IFU 310, in one embodiment, is configured to fetch instructions associated with that address. IFU 310 may be configured to then dispatch these fetched instructions to a select unit (e.g., select unit 210) in some embodiments.

Branch prediction unit 320, in one embodiment, is configured to predict information that is pertinent to the fetching of instructions by IFU 310. Branch prediction unit 320 may include history registers that track prior branch history to predict directions of control transfer instructions (e.g., whether a branch is taken or not). Branch prediction unit 320 may include weight tables that reflect relative weights or strengths of predictions. Branch prediction unit 320 may include target data structures that store fetch addresses that are predicted to be targets of control transfer instructions such as return address prediction unit 322.

Return address prediction unit 322, in one embodiment, is configured to concurrently store return addresses for different threads executing on processor core 300. As noted above, in one embodiment, unit 322 is configured to receive return addresses from IFU 310 in response to IFU 310 fetching call instructions. Unit 322 may be configured to then receive requests for those return addresses from IFU 310 in response to the fetching of return instructions, and to provide the requested return addresses to IFU 310. In some embodiments, unit 322 may be configured to store a single return address or process a request for a single return address during a given cycle. In other embodiments, unit 322 may be configured to store multiple return addresses for different threads and process multiple requests for different threads during a given cycle.

In some embodiments, return address prediction unit 322 is configured to store return addresses in a return address stack that has multiple portions, each dedicated for storing return addresses for a respective thread. For example, return address stack may include a first portion of entries that only store return addresses for a first thread and a second portion for storing return addresses for only a second thread. In one embodiment, unit 322 is configured to maintain, for each thread, a respective identifier specifies a location (e.g., an entry in the return stack) in a dedicated portion to store a return address for that thread. For example, a dedication portion of a thread may include N entries. When no entries have been allocated, an identifier for that thread may specify an entry 0 as the next entry available to store a return address in one embodiment. If unit 322 stores a return address in entry 0, unit 322, in one embodiment, is configured to adjust the identifier accordingly—e.g., unit 322 may increment that identifier to point to entry 1 as the next available entry. As IFU 310 requests return addresses, unit 322 may be configured to deallocate entries that store those addresses—e.g., by decrementing an identifier. In some embodiments, if core 300 is configured to perform out-of-order execution, unit 322 may be configured to maintain multiple identifiers for each thread that include a fetched identifier that is updated upon the fetching of call and return instructions, an executed identifier that is updated upon the execution of call and return instructions, and a commit identifier that is updated upon the commitment of call and return instructions. Embodiments of return address prediction unit 322 that have a return address stack with dedicated portions are described in further detail below in conjunction with FIG. 4.

In some embodiments, return address prediction unit 322 is configured to store return addresses in a return address stack that has dynamically allocable entries that are able to store return addresses for multiple different threads (as opposed to having dedicated portions as described above). For example, a given entry may initially store a return address for thread T0 and subsequently store a return address for thread T1. To track available entries in the stack, unit 322, in one embodiment, is configured to maintain a single identifier (i.e., a single pointer) that specifies an entry that is available to store a new return address. This pointer may be incremented or decremented as return addresses are respectively pushed or pulled from the stack. To track the order in which return addresses are stored, unit 322 may also be configured to maintain a respective age value associated with each thread. As will be described below, in one embodiment, an age value identifies a number of return addresses currently stored by unit 322 for a particular thread. When unit 322 stores a return address for a thread, unit 322 may be configured to store the current age value with that return address. If a request for a return address of a particular thread is subsequently received, unit 322 may be configured to use the current age value (e.g., the current number of stored return addresses for that thread) to locate the most recently stored return address for the requesting thread. Unit 322 may be configured to then service the request by popping that return address from the stack.

In some instances, using dynamically allocable entries may achieve a higher utilization of the return stack than using dedicated portions. Using dynamically allocable entries, however, may be more difficult to implement because keeping track of the logical order of return addresses for each thread is more complicated in a fully shared structure like a dynamic return stack. Thus, the return stack for such an implementation may use additional logic and store additional information to facilitate the location of requested return addresses. Embodiments of return address prediction unit 322 that have a return address stack with dynamically allocable entries are described in further detail below in conjunction with FIG. 5.

Figure 4:
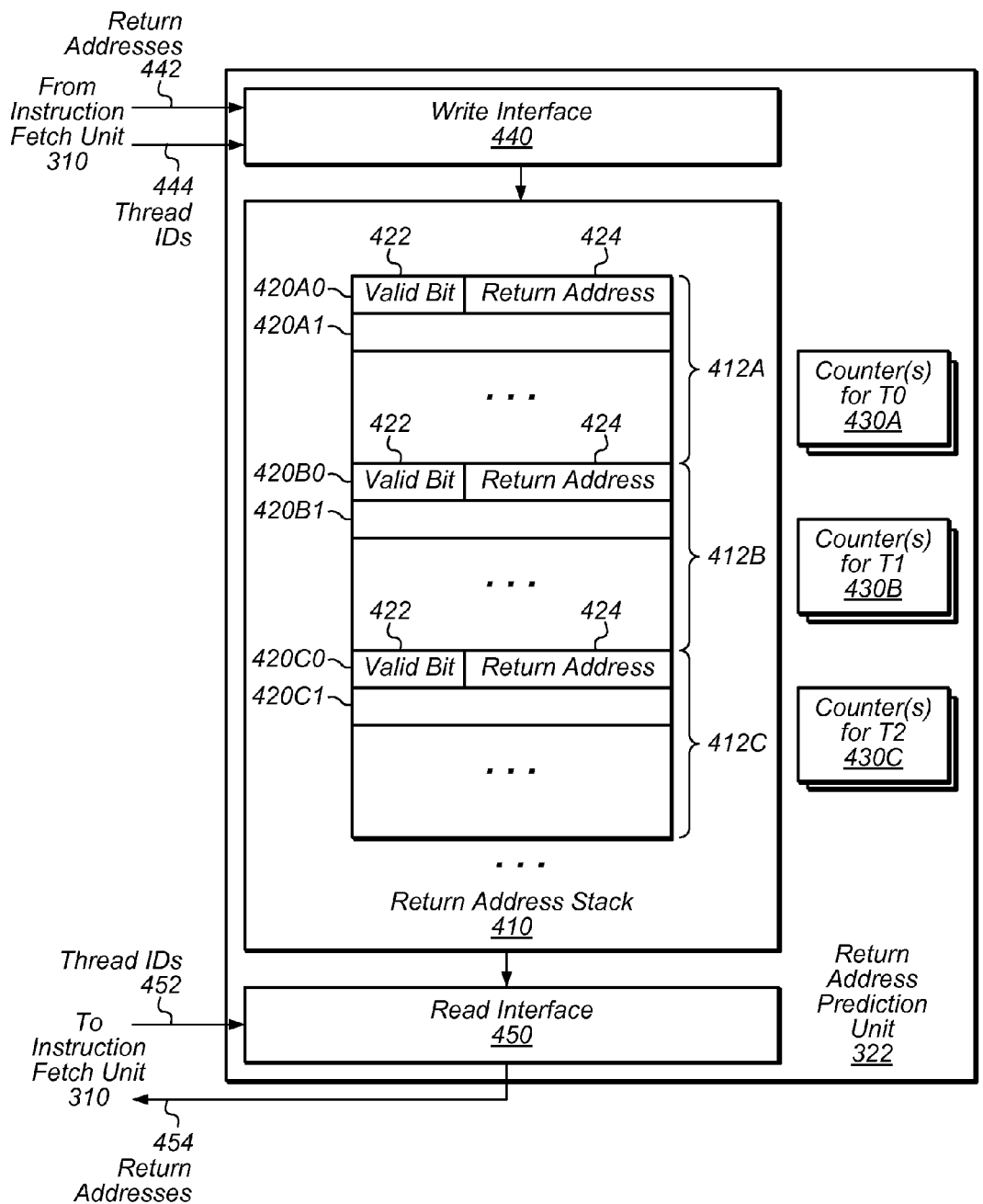
FIG. 4 is a block diagram illustrating one embodiment of the return address prediction unit.

Turning now to FIG. 4, a block diagram illustrating one embodiment of return address prediction unit 322 is depicted. In the illustrated embodiment, return address prediction unit 322 is configured to concurrently store return addresses in a return address stack that has multiple dedicated portions. As shown, return address prediction unit 322 includes return address stack 410, counters 430A-C, write interface 440, and read interface 450. Return address stack 410 includes multiple portions 412A-C dedicated to different threads. Portions 412A-C respectively include entries 420A0-C1, which each include a valid bit 422 and a return address 424.

Return address stack 410 is one embodiment of a memory that is configured to store return addresses 424 in dedicated portions 412. In some embodiments, return address stack 410 may be implemented using a static random access memory (SRAM). In other embodiments, return address stack 410 may be implemented using a dynamic random access memory (DRAM). Return address stack 410 may include one or more write ports and one or more read ports for accessing entries 420. In various embodiments, return address stack 410 includes dedicated portions 412 for each thread supported by core 300 such that each portion 412 is configured to store return addresses for a single thread. For example, in one embodiment, portions 412A, 412B, and 412C may be configured to store return addresses for threads T0, T1, and T2 respectively.

Counters 430, in one embodiment, are configured to track whether entries 420 in portions 412 have been allocated for storing return addresses 424. Write interface 440 and read interface 450 may be configured to read and adjust identifiers stored in counters 430 when accessing entries 420. In various embodiments, counters 430 may be configured to maintain, for each portion 412, a respective identifier that specifies an entry 420 in that portion 412. In one embodiment, the specified entry 420 may be a last allocated (i.e., most recently allocated) entry. In another embodiment, the specified entry 420 may be a next available entry for allocation. For example, if portion 412A corresponds to thread T0 and does not yet include any return addresses, counter 430A, in one embodiment, may store an entry identifier that initially points to entry 420A0. When entry 420A0 is allocated to store a return address 424 for thread T0, the identifier in counter 430A may be adjusted (e.g., by being incremented) so that it now points to entry 420A1. If entry 420A0 subsequently becomes deallocated (e.g., to service a request for a return address stored in that entry), counter 430A may be configured to adjust the entry identifier (e.g., by decrementing that identifier). As will be described below, in some embodiments, if core 300 is configured to support out-of-order execution, counters 430 are configured to maintain multiple identifiers associated with a particular thread that are updated as instructions pass through different execution stages—e.g., a fetch identifier, an execute identifier, and a commit identifier for each thread, in one embodiment. If a misprediction subsequently occurs, unit 322 may be configured to adjust return address stack 410 to a previous state before the misprediction.

Write interface 440, in one embodiment, is configured to process write requests received from IFU 310 by pushing return addresses 442 onto return address stack 410. (As noted above, IFU 312 may be configured to provide such requests in response to fetching call instructions.) In the illustrated embodiment, each request includes a return address 442 and a corresponding thread identifier 444 for that address. In one embodiment, when write interface 440 receives a write request, write interface 440 is configured to generate a write address of an entry 420 by selecting one of counters 430 based on the received thread identifier 444 and concatenating (e.g., using a multiplexer) that identifier 444 with the entry identifier stored in the selected counter 430. (In another embodiment, a counter 430 stores the entire write address.) Once the write address is obtained, write interface 440 may be configured to then store a return address 444 (as a return address 424) in the specified entry 420. Write interface 440, in one embodiment, is also configured to set a valid bit 422 to indicate that the entry 420 has been allocated.

Write interface 440 may also be configured to update one or more entry identifiers in counters 430 associated with the written return address. For example, in one embodiment, if write interface 440 is storing a return address in entry 420A0 for thread T0, write interface 440 may be configured to update an identifier corresponding to thread T0 in counter 430A. In some embodiments, if core 300 supports out-of-order execution, write interface 440 may be configured to update multiple identifiers as a call instruction passes through different execution stages. In one embodiment, write interface 440 is configured to update a first identifier (e.g. a fetch identifier) upon receiving an initial request from IFU 310 to store a return address for a thread and storing that address. Write interface 440 may be configured to update a second identifier (e.g., an execution identifier) upon receiving a subsequent indication that the call instruction has completed being processed in an execution unit. Write interface 440 may be configured to update a final identifier (e.g., a commitment identifier) after receiving an indication that the call instruction has been committed. If a misprediction occurs at some point, return address prediction unit 322 may be configured to adjust return address stack 410 to a previous state by replacing the first identifier with the second or third identifiers.

Read interface 450, in one embodiment, is configured to process read requests received from IFU 310 by popping return addresses 424 from return address stack 410 and providing those addresses (as return addresses 454) to IFU 310. (As noted above, IFU 310 may be configured to request a return address for a thread in response to fetching a return instruction for that thread.) In the illustrated embodiment, requests include thread identifiers 452. When read interface 450 receives a read request, read interface 450, in one embodiment, is configured to generate a read address of an entry 420 by selecting one of counters 430 based on the received thread identifier 452 and concatenating (e.g., using a multiplexer) the thread identifier 452 with the entry identifier stored in the selected counter 430. In some embodiments, the selected counter 430 may be the same counter used during the initial writing of the return address. In other embodiments, the selected counter 430 may be a different counter 430 used specifically for read operations. Once the read address is computed, read interface 450 may be configured to then read the requested return address 454. In one embodiment, read interface 450 is also configured to reset a valid bit 432 to indicate that the entry 420 is not longer allocated. Read interface 450 may also be configured to update an entry identifier for the thread of the requested return address. For example, if read interface 450 reads a return address in entry 420A0 for thread T0, read interface 450 may update an identifier (e.g., specifying a last allocated entry) maintained by a counter 430A. If core 300 supports out-of-order execution, read interface 450, in one embodiment, may be configured to update multiple entry identifiers as a return instruction passes through different execution stages. In some embodiments, read interface 450 may be configured to update identifiers for return instructions in a similar manner as write interface 440 updates identifiers for call instructions.

Figure 5:
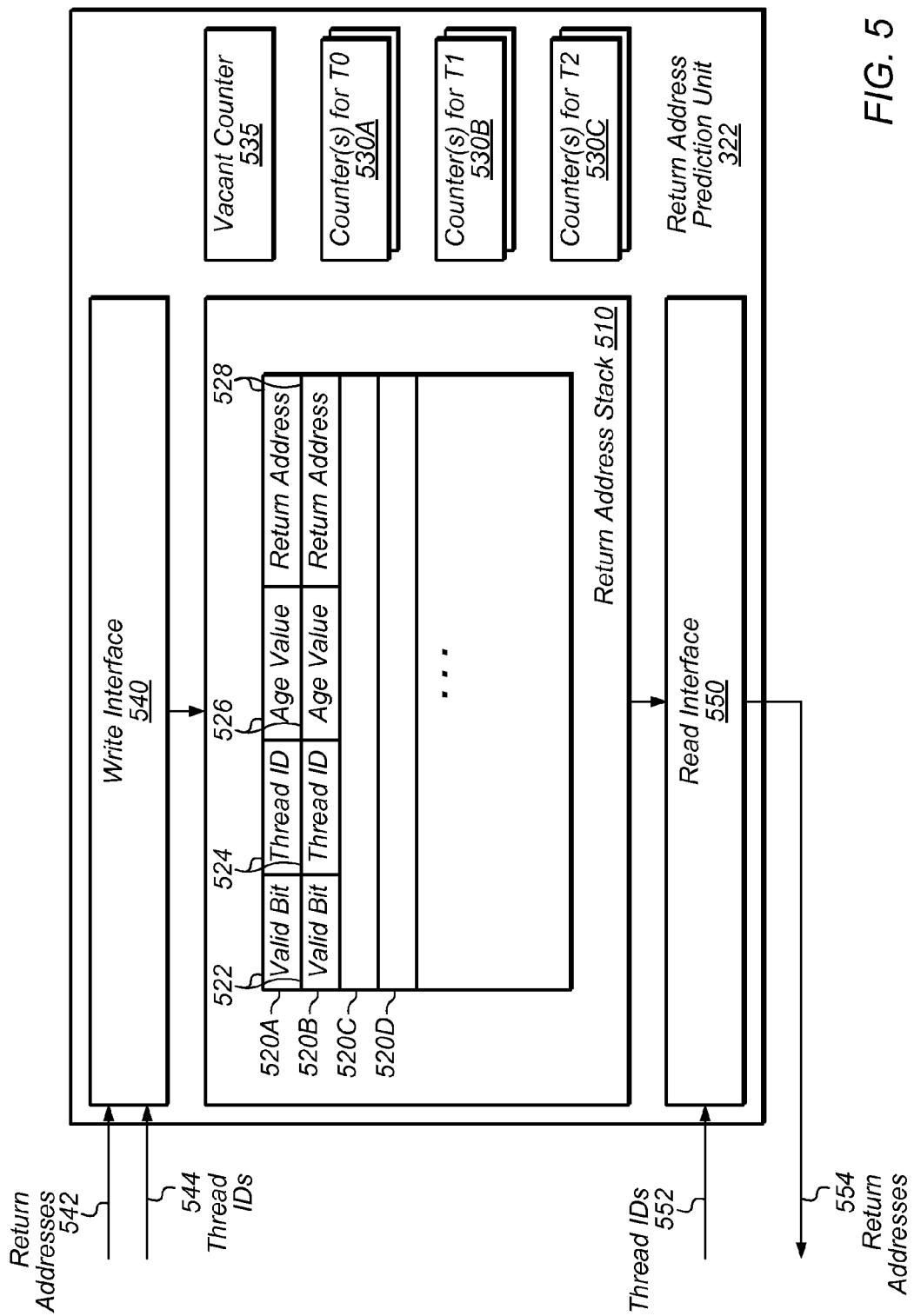
FIG. 5 is a block diagram illustrating another embodiment of the return address prediction unit.

Turning now to FIG. 5, a block diagram illustrating another embodiment of return address prediction unit 322 is depicted. In the illustrated embodiment, return address prediction unit 322 is configured to concurrently store return addresses in a return address stack that has dynamically allocable entries (i.e., entries that can be allocated to store return addresses of different threads). As shown, return address prediction unit 322 includes a return address stack 510, counters 530A-C, vacant counter 535, write interface 540, and read interface 550. Return address stack 510 includes entries 520A-D, which, in turn, include a valid bit 522, thread identifier 524, age value 526, and return address 528.

Return address stack 510 is one embodiment of a memory that is configured to store return address 528 in dynamically allocable entries 520. In some embodiments, the contents of return address stack 510 (e.g., information 522-528) and the contents of counters 530 and 535 may be stored within the same memory structure. In other embodiments, information 522-528 and counters 530 and 535 may be stored in separate structures. For example, in one embodiment, valid bits 522, counters 530, and vacant counter 535 are stored as control states by logic implementing a state machine, which is used by interfaces 540 and 550. Thread identifiers 524, age values 526, and return addresses 528 may be stored in a different structure, such as an SRAM structure. Such an implementation may permit information 522, 530, and 535 to be more easily read and updated by state machine logic in some instances. Return address stack 510 may include one or more write ports and one or more read ports for accessing entries 520. In various embodiments, return address stack 510 is configured to store a return address for any thread supported by core 300 in a particular entry 520. For example, return address stack 510 may initially store a return address 528 for thread T0 in entry 520A and then store a return address 528 for thread T1 in entry 520A. In one embodiment, return address stack 510 is configured as a content addressable memory such that each entry 520 is addressable using a thread identifier 524 and an age value 526.

Counters 530, in one embodiment, are configured to maintain age values that are usable by read interface 550 to access entries 520. As noted above, in one embodiment, an age value for a return address is the number of return addresses that are stored for a particular thread at the time that a return address is stored. For example, if return address stack 510 is storing two return addresses 528 for thread T0 at the time an additional return address of T0 is stored, then the age value for that additional return address is two. An age value in a counter 530 may be increased (or decreased) if additional return addresses 528 are stored in stack 510 for that thread, and may be decreased (or increased) if return addresses 528 are retrieved from stack 510 for that thread. In some embodiments, if core 300 supports out-of-order execution, counters 530 may be configured store separate age values depending upon the fetching, performance, and commitment of instructions such as described below.

Vacant counter 535, in one embodiment, is configured to maintain an entry identifier that specifies an entry 520 that is available for allocation (i.e., available to store a return address 528). Write interface 540 may be configured to use vacant counter 535 to identify an entry 520 for servicing a write request. As return addresses 528 are stored in stack 510 by write interface 540, vacant counter 535 may be adjusted accordingly (e.g., by incrementing the entry identifier). Vacant counter 535 may also be adjusted (e.g. by decrementing the entry identifier) if return addresses 528 are retrieved from stack 510 by read interface 550.

Write interface 540, in one embodiment, is configured to process write requests from IFU 310 by pushing return addresses 542 to return address stack 510. (As noted above, IFU 312 may be configured to provide write requests in response to fetching call instructions.) In the illustrated embodiment, each request includes a return address 542 and a corresponding thread identifier 544 for that address. In one embodiment, when write interface 540 receives a write request, write interface 540 is configured to access vacant counter 535 for an entry identifier of an available entry 520. Write interface 540 may be configured to then write the return address 542 to the available entry 520 as a return address 528. Write interface 540 may also be configured to set a valid bit 522, store the thread identifier 544 as a thread identifier 524, and store an age value 526 of the thread. In one embodiment, write interface 540 is configured to obtain the age of thread by accessing one of counters 530.

In one embodiment, write interface 540 is also configured to update an age value (e.g., by incrementing it) maintained by a counter 530 for the thread associated with the written return address. If core 300 supports out-of-order execution, write interface 540, in some embodiments, is configured to update multiple age values associated with a particular thread at different moments as a call instruction passes through different stages. For example, in one embodiment, if a write request for a call instruction in thread T0 is received, write interface 540 is configured to update a first age value that identifies the number of stored return addresses for fetched instructions in thread T0. Once the call instruction has been processed by an execution unit, write interface 540 may be configured to update a second age value that identifies the number of stored return addresses for processed call instructions in thread T0. After the call instruction is later committed, write interface 540 may be configured to update a third age value that identifies the number of stored return addresses for committed call instructions in thread T0. If a misprediction occurs at some point, return address prediction unit 322 may be configured to adjust return address stack 510 to a previous state by replacing the first age value with the second or third age values.

In one embodiment, write interface 540 is also configured to update the entry identifier maintained by vacant counter 535. In some embodiments, write interface 540 is configured to update the identifier by merely incrementing it. In other embodiments, if return address stack is configured as a content addressable memory, write interface 540 may be configured to select an entry 520 that has an unset valid bit and to cause the entry identifier to specify the selected entry 520.

Read interface 550, in one embodiment, is configured to process read requests received from IFU 310 by popping return addresses 528 from return address stack 510 and providing those addresses (as return addresses 554) to IFU 310. As noted above, IFU 310 may be configured to request a return address for a thread in response to fetching a return instruction for that thread. In the illustrated embodiment, requests include thread identifiers 552. When read interface 550 receives a read request, read interface 550, in one embodiment, is configured to compare the thread identifier 552 and an age value maintained by a counter 530 with thread identifiers 524 and age values 526 in stack 510. If a match is found, read interface 550, in one embodiment, is configured to then provide the return address 528 associated with the matching thread identifier 524 and age value 526 to IFU 310. Read interface 550 may also be configured to reset the valid bit 522 in the entry 510 associated with that return address 528, and to adjust the entry identifier maintained by vacant pointer 535. Read interface 550 may also be configured to update an age value maintained by counter 530 for that requesting thread. In some embodiments, if core 300 supports out-of-order execution, read interface 550 may be configured to update multiple age values as a return instruction passes through different execution stages. In some embodiments, read interface 550 may be configured to update age values for return instructions in a similar manner as write interface 540 updates identifiers for call instructions. Read interface 550 is described in further detail next in conjunction with FIG. 6.

Figure 6:
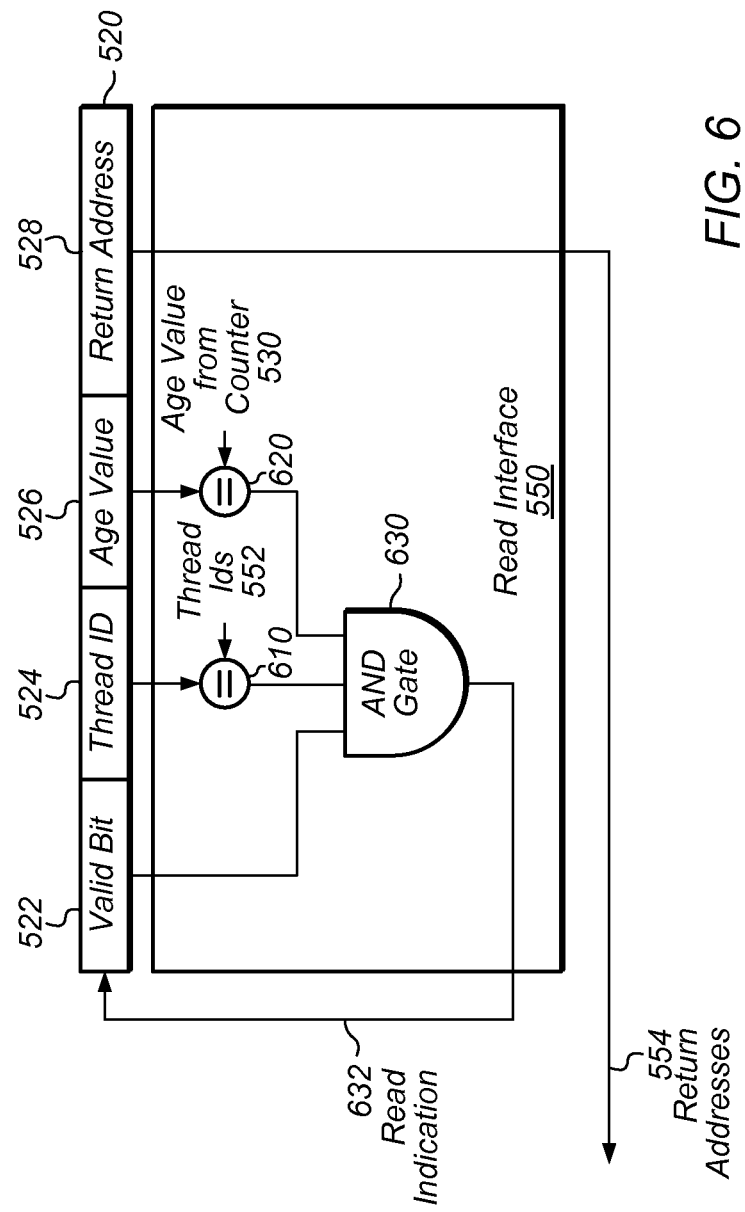
FIG. 6 is a block diagram illustrating one embodiment of a read interface in the return address prediction unit.

Turning now to FIG. 6, a block diagram of read interface 550 is depicted. As discussed above, in one embodiment, read interface 550 is configured to pop return addresses 528 from return address stack 510 and to provide those addresses (as return addresses 554) to IFU 310. In the illustrated embodiment, read interface 550 includes comparison units 610 and 620 and AND gate 630. In some embodiments, read interface 550 may include a respective set of elements 610-630 for each entry 520. In other embodiments, read interface 550 may share a set of elements 610-630 among multiple entries (e.g., by using one or more multiplexers).

Comparison unit 610, in one embodiment, is configured to compare a thread identifier 524 in an entry 520 with a thread identifier 552 received in a request from IFU 310. In the illustrated embodiment, comparison unit 610 is configured to provide a result of the comparison to AND Gate 630. In one embodiment, comparison unit 610 may be configured to drive a logical one value if a match is found and a logical zero value if a match is not found.

Comparison unit 620, in one embodiment, is configured to compare an age value 526 in an entry 520 with an age value maintained by a counter 530 for the requesting thread. In the illustrated embodiment, comparison unit 620 is configured to provide a result of the comparison to AND Gate 630. In various embodiments, comparison unit 620 may be configured to indicate a result in a similar manner as comparison unit 610.

AND gate 630, in one embodiment, is configured to perform a logical AND of a valid bit 522 and the outputs of comparison units 610 and 620 for an entry 520. If the valid bit 522 is set and both comparison units 610 and 620 identify matches, AND gate 630, in one embodiment, is configured to output a read indication 632 specifying that the entry 520 includes the requested return address. Read interface 550 may be configured to then read that address 528 and provide it to IFU 310. On the other hand, if the valid bit 522 is not set or one of the comparison units 610 and 620 identify a mismatch, AND gate 630, in one embodiment, is configured to output a read indication 632 specifying that the entry 520 does not include the requested return address 528. Read interface 550 may be configured to then not read that address 528. (It is noted that different forms of logic may be used in other embodiments to determine whether an entry 520 stores a requested return addresses 528.)

Figure 7:
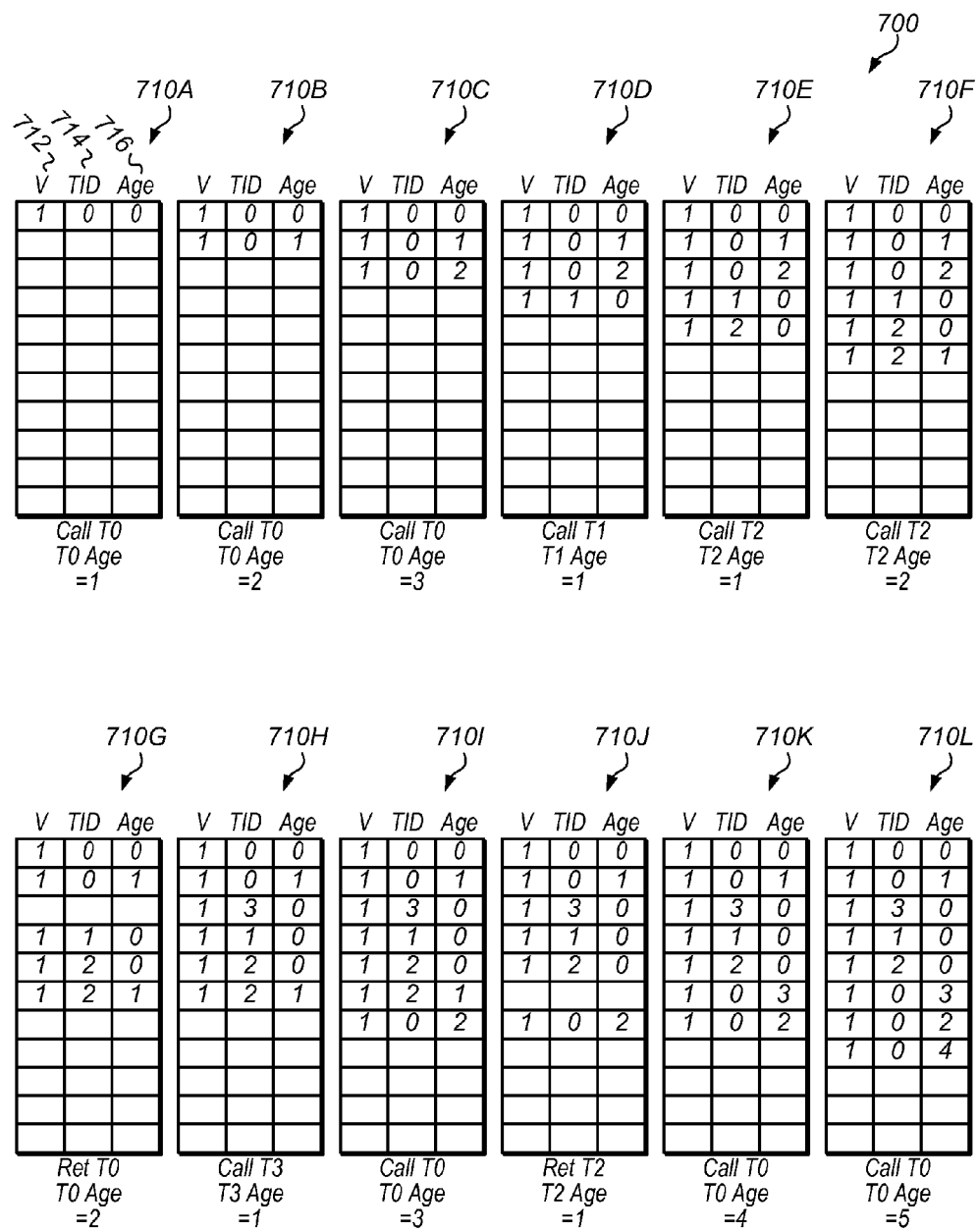
FIG. 7 is a block diagram illustrating an example using one embodiment of the return address prediction unit.

Turning now to FIG. 7, a block diagram of an example 700 is depicted. Example 700 illustrates different stages 710A-L of one embodiment of return address stack 510 as return address prediction unit 322 receives write and read requests from IFU 310. As shown, each stage 710 depicts stored valid bits 712, thread identifiers 714, and age values 716.

Example 700 begins in stage 710A with the processing of a write request for a call instruction in thread T0. In stage 710A, an entry is added that has a set valid bit of 1 and specifies a thread identifier 714 of 0 and an age value 716 of 0 since the return address stack is initially empty. The age value for the next return address of thread T0 is also incremented to 1. In stages 710B and 710C, additional call instructions in thread T0 are processed, and corresponding entries are added to the return address stack. At this point, the age value for the next return address of thread T0 becomes 3. In stages 710D-F, call instructions in threads T1 and T2 are processed, and corresponding entries are added to the return stack.

A return instruction in thread T0 is finally processed in stage 710G. The age value for the next return address of thread T0 is decremented to 2, and the return address stored in the entry with an age value of 2 is popped from the stack. In stage 710H, the entry is reallocated to store a return address for a call instruction in thread T3. Another call instruction is processed for thread T0 in stage 710I. A return instruction is then processed for thread T2 in stage 710J. Finally, in stages 710K and 710L two additional call instructions are processed for thread T0.

Note that a potential advantage of using dynamically allocable entries (in some embodiments) is that the return address stack can be better utilized. While threads T1-3 each use only one entry in stage 710L, thread T0 is able to use five entries. If dedicated portions were used instead, the return address stack might not have sufficient space for each return address of thread T0 in some instances.

Turning now to FIG. 8, a flow diagram of a method 800 is depicted. Method 800 is one embodiment of a method that may be performed by a return address prediction unit of a processor, such as return address prediction unit 122, to predict return addresses for fetching instructions. In some instances, performing method 800 may improve instruction throughput for a processor.

In step 810, return address prediction unit 122 stores return addresses (e.g., return addresses 424 or 528) for different threads executable on a processor. In one embodiment, an instruction fetch unit (e.g., IFU 310) of the processor fetches instructions including call instructions executable on the processor. In response to fetching the call instructions, the instruction fetch unit may send requests to the return address prediction unit to cause it to store the predicted return address. In various embodiments, the requests specify thread identifiers (e.g., thread identifiers 442 or 542) of the threads that include the call instructions. In some embodiments, return address prediction unit 322 stores the return addresses in a memory (e.g., return address stack 410) that has dedicated portions (e.g., portions 412) that are each configured to store return addresses for a respective thread and not return addresses of other threads. In one embodiment, the return address prediction unit maintains a respective identifier (e.g., in counters 430) for each thread, and each respective identifier specifies a location (e.g., an entry 420) in a respective dedicated portion for that thread (e.g., portion 412A for thread T0) to store a return address. In some embodiments, return address prediction unit 322 stores the return addresses in a memory (e.g., return address stack 510) that has a plurality of dynamically allocable entries (e.g., entries 520) that are configured to store a return address of different threads. In one embodiment, entries store thread identifier (e.g., thread identifiers 524) specifying threads associated with the return addresses. In one embodiment, return address prediction unit 322 maintains a respective age value (e.g., in counters 530) corresponding to each thread, and each respective age value identifies a number of return addresses stored by the return address prediction unit for that thread. In one embodiment, the return address prediction unit also stores the current age value (e.g., age values 526) of a thread with a return address when it stores that address.

In step 820, return address prediction unit 322 receives requests for predicted return addresses for ones of the threads. The requests may include identifications (e.g., thread identifiers 452 or 552) of the requesting threads. In one embodiment, the instruction fetch unit fetches instructions including return instructions executable on the processor. The instruction fetch unit may then send requests to return address prediction unit 322 in response to fetching the return instructions. In various embodiments, return address prediction unit 322 uses the identifications of the requesting threads to identify the requested return addresses. In some embodiments, return address prediction unit 322 also uses age values (e.g., age values 526) associated with the requesting threads to identify requested return addresses.

In step 830, return address prediction unit 322 provides the predicted return addresses to the requesting thread. In various embodiments, the instruction fetch unit uses the requested return address to fetch instructions associated with the return address. In some instances, the fetched instructions are instructions that come after the initial call instructions that caused storage of the return addresses. The instruction fetch unit may dispatch these fetched instructions to a select unit (e.g., select unit 210) in some embodiments. In one embodiment, return address prediction unit 122 may deallocate entries that stored return addresses (e.g., by resetting valid bits 422 or 522) upon providing those return addresses to the instruction fetch unit. In various embodiments, return address prediction unit 322 may also update an identifier that specifies an entry that is available to store a return address in response to providing a return address to a requesting thread.

Turning now to FIG. 9, a flow diagram of a method 900 is depicted. Method 900 is another embodiment of a method that may be performed by a processor, such as processor 10, to predict return addresses for fetching instructions. In some instances, performing method 900 may improve instruction throughput for a processor.

In step 910, processor 10 (e.g., using IFU 310) fetches a first block of instructions including a first call instruction of a first thread. In one embodiment, the first block includes instructions from only a single thread. In another embodiment, the first block includes instructions from multiple threads. In some embodiments, processor 10 may determine whether the first block includes call instructions based on decode information stored in an instruction cache (e.g., instruction cache 312). In one embodiment, upon identifying the first call instruction, an instruction fetch unit provides a return address for the call instruction to a return address prediction unit (e.g., return address prediction unit 322) for storage. If multiple call instructions are identified in the first block, the instruction fetch unit may process the call instruction that occurs first and not process the other call instructions. In one embodiment, the provided return address may be the address of the instruction that follows the first call instruction. In some embodiments, the provided return address may be the address of an instruction that does not come after the first call instruction. In some embodiments, the instruction fetch unit identifies the thread of the call instruction to the return address prediction unit when it provides the return address.

In step 920, processor 10 fetches a second block of instructions including a second call instruction of a second thread. In various embodiments, processor 10 performs step 920 in a similar manner as step 910. In some embodiments, processor 10 is configured to perform steps 910 and 920 concurrently.

In step 930, processor 10 stores first and second return addresses associated with the first and second call instructions in a memory dedicated to storing return addresses (e.g., return address stack 410 or 510). In some embodiments, processor 10 may store the return addresses in a similar manner as step 810 described above. In various embodiments, processor 10 may subsequently fetch a third block of instructions including a first return instruction corresponding to the first call instruction. An instruction fetch unit may provide a request for the first return address to a return address prediction unit (e.g., return address prediction unit 322). In some embodiments, the request may be provided in a similar manner as step 820 described above. The return address prediction unit may then provide the requested return address to the instruction fetch unit. In some embodiments, the requested return address may be provided in a similar manner as step 830 described above. Processor 10 may then use the stored first return address to subsequently fetch a fourth block of instructions, prior to executing the first return instruction.

Exemplary System Embodiment

As described above, in some embodiments, processor 10 of FIG. 1 may be configured to interface with a number of external devices. One embodiment of a system 1000 including processor 10 is illustrated in FIG. 10. In the illustrated embodiment, system 1000 includes an instance of processor 10, shown as processor 10*a*, that is coupled to a system memory 1010, a peripheral storage device 1020 and a boot device 1030. System 1000 is coupled to a network 1040, which is in turn coupled to another computer system 1050. In some embodiments, system 1000 may include more than one instance of the devices shown. In various embodiments, system 1000 may be configured as a rack-mountable server system, a standalone system, or in any other suitable form factor. In some embodiments, system 1000 may be configured as a client system rather than a server system.

In some embodiments, system 1000 may be configured as a multiprocessor system, in which processor 10*a* may optionally be coupled to one or more other instances of processor 10, shown in FIG. 10 as processor 10*b*. For example, processors 10*a-b* may be coupled to communicate via their respective coherent processor interfaces 160.

In various embodiments, system memory 1010 may comprise any suitable type of system memory as described above, such as FB-DIMM, DDR/DDR2/DDR3/DDR4 SDRAM, RDRAM®, flash memory, and of various types of ROM, etc. System memory 1010 may include multiple discrete banks of memory controlled by discrete memory interfaces in embodiments of processor 10 that provide multiple memory interfaces 130. Also, in some embodiments, system memory 1010 may include multiple different types of memory.

Peripheral storage device 1020, in various embodiments, may include support for magnetic, optical, or solid-state storage media such as hard drives, optical disks, nonvolatile RAM devices, etc. In some embodiments, peripheral storage device 1020 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 1020 may be coupled to processor 10 via peripheral interface(s) 150 of FIG. 1.

As described previously, in one embodiment boot device 1030 may include a device such as an FPGA or ASIC configured to coordinate initialization and boot of processor 10, such as from a power-on reset state. Additionally, in some embodiments boot device 1030 may include a secondary computer system configured to allow access to administrative functions such as debug or test modes of processor 10.

Network 1040 may include any suitable devices, media and/or protocol for interconnecting computer systems, such as wired or wireless Ethernet, for example. In various embodiments, network 1040 may include local area networks (LANs), wide area networks (WANs), telecommunication networks, or other suitable types of networks. In some embodiments, computer system 1050 may be similar to or identical in configuration to illustrated system 1000, whereas in other embodiments, computer system 1050 may be substantially differently configured. For example, computer system 1050 may be a server system, a processor-based client system, a stateless "thin" client system, a mobile device, etc. In some embodiments, processor 10 may be configured to communicate with network 1040 via network interface(s) 160 of FIG. 1.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A processor, comprising:
    a return address prediction circuit configured to:
        store return addresses for different ones of a plurality of threads executable on the processor, wherein the return address prediction circuit includes a content addressable memory having a plurality of entries, wherein each entry is configured to store a respective one of the return addresses and a thread identifier indicative of one of the plurality of threads, wherein each of the plurality of entries is configured to store a respective age value indicative of an ordering in which return addresses are stored for a respective one of the plurality of threads;
        store a respective counter value for each thread, wherein each counter value is indicative of a total number of return addresses currently stored for a respective one of the plurality of threads by the return address prediction circuit;
        receive a first request for a predicted return address for a first thread of the plurality of threads, wherein the first request includes an indication of the first thread; and
        provide the predicted return address to the first thread in response to the content addressable memory 1) determining that the indication of the first thread corresponds to a thread identifier in an entry that includes the predicted return address and 2) determining that an age value stored in the entry that contains the predicted return address corresponds to the counter value for the first thread.

2. The processor of claim 1, further comprising:
    an instruction fetch unit configured to fetch instructions including a return instruction executable on the processor; and
    wherein the instruction fetch unit is configured to send the first request to the return address prediction circuit in response to fetching the return instruction.

3. The processor of claim 1, further comprising:
    an instruction fetch unit configured to fetch instructions including a call instruction executable on the processor; and
    wherein the return address prediction circuit is configured to store the predicted return address in response to the instruction fetch unit fetching the call instruction.

4. The processor of claim 1, wherein each of the plurality of entries is configured to store a return address of any one of the plurality of threads.

5. A method, comprising:
    fetching, by a processor, a first block of instructions including a first call instruction of a first thread, wherein the first call instruction is associated with a first return address;
    fetching, by the processor, a second block of instructions including a second call instruction of a second thread, wherein the second call instruction is associated with a second return address;
    concurrently storing, by the processor, the first and second return addresses in a content addressable memory having a first entry and a second entry, wherein the storing includes:
        the first entry storing the first return address, a thread identifier of the first thread, and an age value indicative of an ordering in which the first return address is stored;
        the second entry storing the second return address, a thread identifier of the second thread, and an age value indicative of an order in which the second return address is stored; and
        updating a first counter value and a second counter value, wherein the first counter value is indicative of a total number of return addresses currently stored for the first thread, and wherein the second counter value is indicative of a total number of return addresses currently stored for the second thread;
    fetching, by the processor, a third block of instructions including a first return instruction corresponding to the first call instruction;
    prior to execution of the first return instruction:
        comparing, by the content addressable memory, 1) a thread identifier associated with the first return instruction with the thread identifier stored in the first entry and 2) the first counter value with the age value indicative of the ordering in which the first return address is stored; and
        using, by the processor and based on the comparing, the stored first return address to subsequently fetch a fourth block of instructions.

* * * * *